United States Patent [19]

Chen et al.

[11] Patent Number: 4,767,980
[45] Date of Patent: Aug. 30, 1988

[54] INDUCTANCE MULTIPLIER CIRCUIT

[75] Inventors: William I. H. Chen, Bedford; Philip Dillon, Arlington; Glenn Yancey, Burleson, all of Tex.

[73] Assignee: Reliance Comm/Tec Corporation, Chicago, Ill.

[21] Appl. No.: 111,215

[22] Filed: Oct. 22, 1987

[51] Int. Cl.$^4$ ............................................. H01F 27/42
[52] U.S. Cl. ..................................... 323/356; 379/413
[58] Field of Search ............... 323/355, 356, 357, 358, 323/359; 363/75, 90, 91; 379/398, 413

[56] References Cited

U.S. PATENT DOCUMENTS

| | | | |
|---|---|---|---|
| 3,714,548 | 1/1973 | Macrander | 323/356 |
| 3,881,149 | 4/1975 | Kiko | 323/356 |
| 3,959,718 | 5/1976 | Hasegawa | 323/356 |
| 4,046,967 | 9/1977 | O'Neill | 379/413 |
| 4,064,449 | 12/1977 | Macrander | 323/356 |
| 4,241,239 | 12/1980 | Pernyeszi | 379/413 |
| 4,463,307 | 7/1984 | Kiko et al. | 323/356 |
| 4,503,289 | 3/1985 | Spires | 323/356 |

Primary Examiner—Peter S. Wong
Attorney, Agent, or Firm—Michael M. Rickin

[57] ABSTRACT

A circuit for increasing the apparent inductance presented by a transformer to a differential signal. The circuit may be used in a battery feed interface circuit for providing battery power to a subscriber's telephone or in a current sink interface circuit for providing a low impedance DC loop closure toward a telephone line feed circuit while maintaining a high impedance for differential AC signals. In either usage the inductance multiplier circuit always multiplies the primary inductance of the transformer by a factor which is one plus a positive number. The transformer has three windings. The multiplication is accomplished by a current source which provides to the third winding a current which flows therein in a manner so as to oppose the current flowing in that winding due to the voltage induced in that winding when the first and second windings are excited by the differential AC signal.

18 Claims, 3 Drawing Sheets

INDUCTANCE MULTIPLIER CIRCUIT

BACKGROUND OF THE INVENTION

1. Field of the Invention

This invention relates to a circuit for increasing the inductance of a transformer and more particularly to an inductance multiplier for use with a line circuit battery feed inductor or with an inductor used in a current sink circuit.

2. Description of the Prior Art

Inductors have traditionally been used in telephony in battery feed circuits to allow a DC current to be fed to a telephone circuit. The use of the inductor allows the current to be fed to the telephone circuit through an impedance which appears resistive at frequencies below the telephone voice band cut which exhibits a very high impedance in the voice band. This very high impedance serves to prevent the battery feed circuit from loading the voice circuit and either increasing its loss or degrading its return loss. The very high impedance in the voice band further serves to attenuate cross talk between subscribers using the same common battery and to prevent noise which may be present at the battery terminals from reaching the subscriber line.

In summary, the use of an inductor exhibiting the impedance characteristics described above in a battery feed circuit has proven to be reliable and compatible with nearly all terminal equipment. The major drawback has been the large physical size and expense of the components used therein to obtain the desired impedance characteristics. Traditionally, the circuit has been physically embodied using a transformer or relay which has had split windings coupled by a DC blocking midpoint capacitor. Because the split windings must carry significantly large DC currents, the core of the transformer must be fairly large to keep it from saturating.

There have been several electronic schemes proposed in the prior art to reduce the size of the transformer or inductor, i.e., electronically multiply the inductance. One such scheme is disclosed in U.S. Pat. No. 3,881,149 which is assigned to the same assignee as is the present invention. As disclosed therein the transformer size is reduced by multiplying its inductance by placing an electronically simulated negative inductor in parallel with a tertiary winding. Another such scheme is disclosed in U.S. Pat. No. 4,463,307 wherein what can be said to be an improved version of the circuit disclosed in the '149 patent is described.

The schemes disclosed in both the '149 and '307 patents both depend upon cancelling a portion of the inductive susceptance of the inductor or transformer in order to multiply the inductance. To do that they both require an accurate knowledge of the inductance to be multiplied. In addition, the inductor must remain temperature stable, and cannot change its inductance significantly with DC current flow therethrough, or the composite inductance may change sign or become unstable. Also as set forth in the specification of the '307 patent, the practical maximum inductance multiplier factor achieved by the circuit described therein is in the order of 5 or 6.

In contrast thereto, the multiplier circuit of the present invention allows for multiplication factors of 20 or greater to be obtained. As will be described in more detail below, it allows any inductor to be multiplied by a predictable factor as long as a stable feedback loop is maintained. It also permits the use of a physically small pot core inductor. Thus, the multiplier circuit of the present invention allows there to be provided a much larger effective inductor in a much smaller physical size than has heretofore been the case.

SUMMARY OF THE INVENTION

An inductance multiplier circuit for providing a greater apparent inductance to differential signals having an AC component than the actual inductance presented to those signals by a transformer.

The present invention is embodied by a circuit which has a transformer having three inductively coupled windings. Two of the windings have first terminals which are connected to first and second inputs of the circuit such that a voltage is induced in the third winding only when the first two windings are excited by a differential signal having an AC component. A detector is connected to the second terminals of the two windings to detect only the AC component of the differential signal and generate a detected signal. A current source is connected to the third winding and responds to the detected signal to produce a current which is provided to the third winding in a manner so as to oppose the current flow in that winding due to the induced voltage. The current flow in all of the windings is reduced and in this manner the greater apparent inductance is provided to the differential signal at the terminals of the two windings.

DESCTIPTION OF THE DRAWING

DESCRIPTION OF THE PREFERRED EMBODIMENTS

Figure 1:
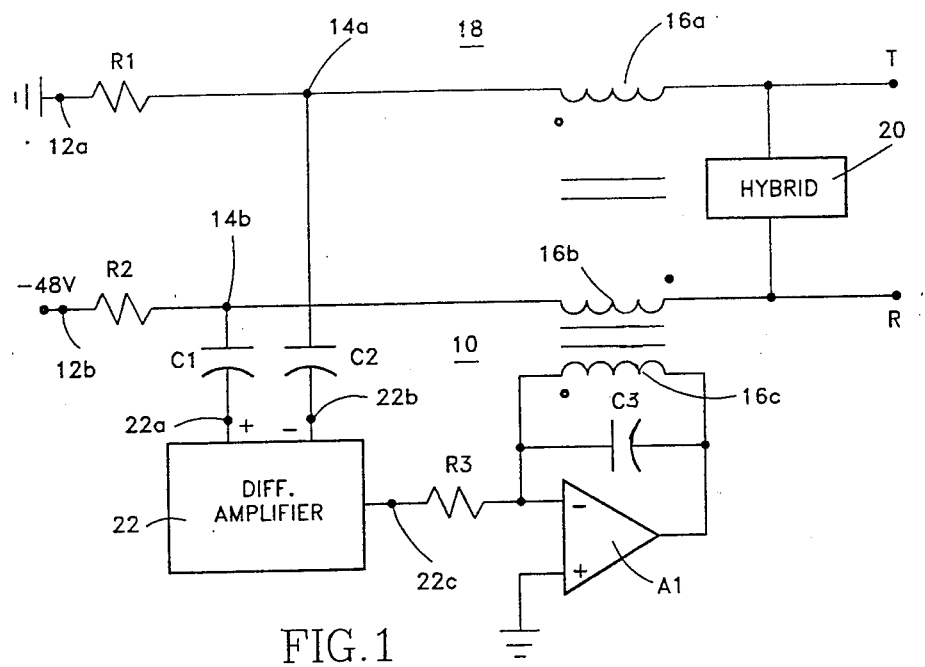
FIG. 1 is a block-schematic diagram showing a first embodiment for the inductance multiplier circuit of the present invention.

Referring now to FIG. 1 there is shown a first embodiment for the inductance multiplier circuit 10 of the present invention. The subscriber equipment is connected to the terminals designated as T (tip) and R (ring) of battery feed circuit 18. The terminals 12a and 12b are connected to ground and −48 V, respectively.

The two resistors R1 and R2 which are connected between terminal 12a and junction 14a, and terminal 12b and junction 14b, respectively, are used to sense the flow of AC current in windings 16a and 16b of transformer T1. The resistors R1 and R2 also serve to build out the resistance presented by the battery feed circuit 18 to terminals T and R to the desired DC value. A hybrid 20 such as the electronic hybrid disclosed in U.S. Pat. No. 4,331,842 is connected in parallel with battery feed circuit 18 and the T and R terminals, and presents to those terminals the appropriate impedance, for example, 900 ohms in series with 2.17 uf. It will be understood that other types of hybrids or transmission devices which block DC current could also be used.

As will be described in more detail below, inductance multiplier circuit 10, responds to the sensed AC current flowing in windings 16a and 16b of transformer T1 to inject a current into winding 16c of that transformer. Winding 16c is a part of circuit 10. In this embodiment there is a 1:1 turns ratio between windings 16a, 16b and winding 16c. Therefore, the total series inductance of windings 16a, 16b is equal to the inductance of windind 16c. The current is injected in winding 16c so as to increase the flux in the inductor represented by windings 16a and 16b so that the total series inductance of windings 16a, 16b is made to appear to be multiplied by a predetermined positive factor. Alternatively, the effect of circuit 10 may be thought of as increasing the voltage drop across the inductor represented by winding 16c and therefore across windings 16a, 16b in a direction which opposes current flow therethrough. By the well known relationship between voltage and current in an inductor the total series inductance of the inductor represented by windings 16a, 16b then is made to appear to be multiplied by the predetermined postive factor. Either way of viewing the effect of circuit 10 on battery feed circuit 18 is acceptable.

Circuit 10 includes a unity gain differential amplifier 22 whose differential inputs 22a, 22b are connected to junctions 14a and 14b of circuit 18 by capacitors C1 and C2, respectively. Input 22a is the noninverting input of amplifier 22 whereas input 22b is the amplifier's inverting input. The capacitors C1 and C2 block any DC current present at terminals 12a, 12b from flowing in circuit 10.

Amplifier 22 provides at its output 22c a single ended voltage from the differential voltages at its inputs. Amplifier 22 is designed to have good common mode rejection so that the voltage at its output is immune to any longitudinal voltages at juctions 14a, 14b. To that end, resistors R1 and R2 must be well matched, as must the resistances of windings 16a and 16b. Amplifier 22 may be embodied in any one of a number of ways well known in the art such as, for example, by two operational amplifier each having their inverting input connected to one of junctions 14a, 14b and the output of one amplifier being connected to the input of the other.

The ouput of differential amplifier 22 is connected by resistor R3 to the inverting input of operational amplifier A1. The inverting input of A1 is connected to the amplifier's output by the parallel combination of winding 16c of transformer T1 and capacitor C3. The noninverting input of A1 is connected to ground. The capacitor C3 prevent circuit 10 from oscillating and thereby provides stability.

The inverting input to amplifier A1 is held by feedback to be at zero volts. The voltage at the output 22c of amplifier 22 produces a current through resistor R3. That current must then by the feedback described above be equal to the current flowing through winding 16c. Since amplifier 22 is operated at unity gain, it is seen that the current flowing into the dotted end of winding 16c is related to the voltage between terminals 14a and 14b by a transconductance, $g_m$, which is the inverse of R3.

Figure 2:
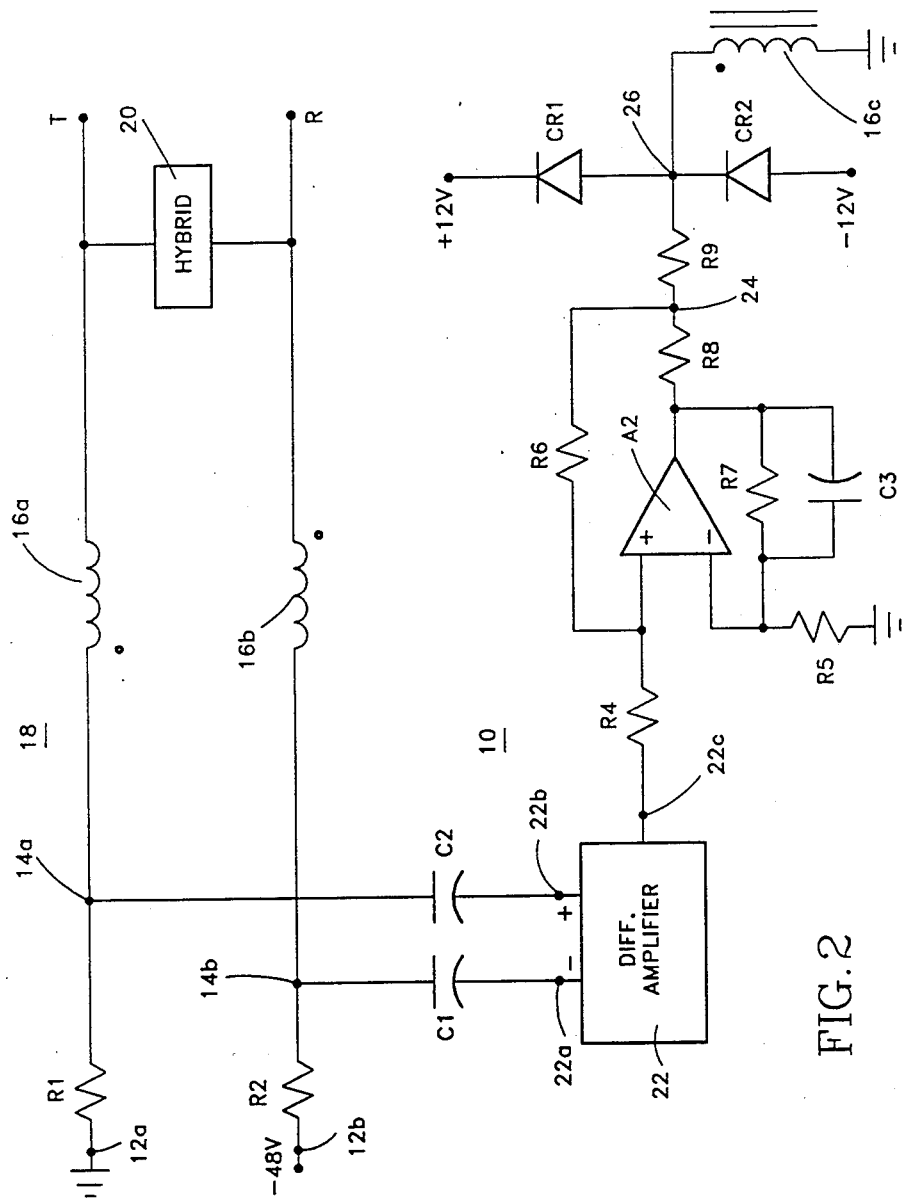
FIG. 2 is a block-schematic diagram showing a second embodiment for the inductance multiplier circuit of the present invention.

Referring now to FIG. 2 there is shown a second embodiment for inductance multiplier circuit 10 in battery feed circuit 18. This embodiment differs from the one shown in FIG. 1 in that it does not use the amplifier A1 with winding 16c in its feedback loop. The use of winding 16c in the feedback loop of amplifier A1 allows any termination across the T and R terminals to appear by transformer action across winding 16c, and therefore, in the local feedback loop of amplifier A1. This may not be desirable. As the two embodiments are otherwise similar the same reference designators are used for those parts of both embodiments which are the same.

The output 22c of differential amplifier 22 of FIG. 2 is connected by resistor R4 to the noninverting input of amplifier A2. Amplifier A2 has its inverting input connected to ground by resistor R5 and by a resistor R7 to the output of the amplifier. A capacitor C3 is connected in parallel with resistor R7 in order to insure stability.

The output of amplifier A2 is connected by a resistor R8 to junction 24. A resistor R6 connects junction 24 to the noninverting input of amplifier A2. In this embodiment resistors R4, R5, R6 and R7 each have the same resistance which is selected to be large compared to the resistance of resistors R8, R9 and the load reflected into winding 16c from windings 16a and 16b. By so selecting those resistors there is produced at junction 24 a current which is equal to the output voltage of differential amplifier 22 divided only by the resistance of resistor R8. If the resistances of resistors R4, R5, R6 and R7 were not equal then the current at junction 24 would depend not only on the resistance of R8 but also on the resistance of R4 to R7. Therefore, amplifier A2 acts as a voltage controlled current source.

Junction 24 is connected by a resistor R9 at junction 26 to one end of winding 16c, the other end of which is connected to ground. Diodes CR1 and CR2 connect junction 26 to +12 V and −12 V, respectively which voltages are also used to power amplifier A2. The resistor R9 and the diodes CR1 and CR2 provide surge protection for amplifier A2. As in the embodiment of FIG. 1, the current at junction 24 is injected in winding 16c in a direction so as to increase the flux in the inductor represented by windings 16a, 16b so that the total series inductance of those two windings appears to be multiplied by a predetermined positive factor. In this case, the current flowing into the dotted end of winding 16c is related to the voltage between terminals 14a and 14b by a transconductance, $g_m$, equal to the inverse of R8.

Figure 3:
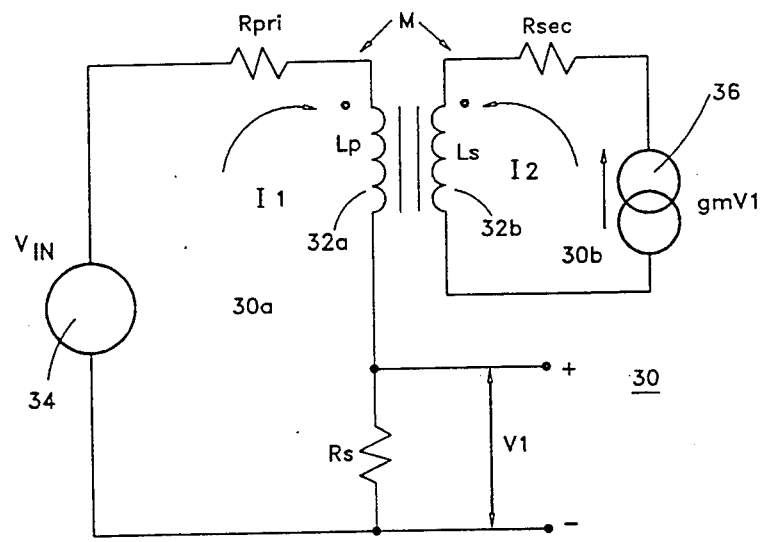
FIG. 3 is a schematic diagram showing the equivalent circuit for the embodiment shown in FIGS. 1 and 2.

Referring now to FIG. 3 there is shown an equivalent circuit 30 for the embodiments shown in FIGS. 1 and 2. This equivalent circuit 30 will be used to explain the theory underlying the inductance multiplication provided by the present invention.

In circuit 30 there is a transformer 32 with a primary winding 32a having an inductance Lp and a secondary winding 32b having an inductance Ls. The transformer has a mutual inductance, M. The circuit 30 has a primary circuit 30a which includes winding 32a and a secondary circuit 30b which includes winding 32b.

A voltage source 34 having a voltage, Vin, is connected to winding 32a. The remainder of primary circuit 30a includes a resistor Rpri which represents the resistance of winding 32a and a resistor $R_S$. The current flow in the primary circuit 30a is designated as $I_1$ and the voltage developed across resistor $R_S$ is designated as V1.

Secondary circuit 30b includes a current source 36 which produces a current $I_2$ in that circuit. The current $I_2$ produced by source 36 is set equal to $g_m V_1$, wherein $g_m$ is the transconductance relating $I_2$ to V1. The resistor Rsec represents the resistance of the secondary winding 32b.

The voltage, Vin, may be expressed as:

$$Vin = (SLp + R_S + Rpri)I_1 + MSI_2$$

As set forth above the current $I_2$ is equal to $g_m V_1$ and as $V_1$ is equal to $I_1 R_S$, the current $I_2$ may be expressed as:

$$I_2 = g_m I_1 R_S$$

Substituting the above expression for $I_2$ in the expression for Vin, allows that voltage after terms are combined, to be expressed as:

$$V_{in} = (S(L_p + M g_m R_S) + R_S + R_{pri})I_1$$

The impedance, Zin, seen looking into circuit 30a may then be expressed as:

$$Z_{in} = V_{in}/I_1 = S(L_p + M g_m R_S) + (R_S + R_{pri})$$

The mutal inductance, M, of transformer 32 can be expressed as:

$$M = K\sqrt{L_p L_s}$$

where K is the coefficient of coupling and $0 \leq K \leq 1$

If Lp=Ls, i.e., the transformer 32 has a one to one turns ratio, then:

$$M = K L_p, \text{ and}$$

$$Z_{in} = S L_p(1 + K g_m R_S) + R_S + R_{pri}$$

The effective inductance, Leff is then:

$$L_{eff} = L_p(1 + K g_m R_S)$$

From the above it can be seen that circuit 30 has caused the primary inductance, Lp, to be multiplied by a factor of $1 + K g_m R_S$ (referred to hereinafter as the multiplication factor). The specific value of K will depend on how inductors 16a, 16b, 16c of FIGS. 1 and 2 are embodied. If pot cores are used to embody the inductors then K ranges from 0.97 to 0.995.

Referring once again to FIGS. 1 and 2, the multiplication factor (M.F.) provided by the circuits shown therein will now be computed. In the embodiment of FIG. 1, the transconductance is determined by resistor R3 whereas, in the embodiment of FIG. 2 the resistor R8 determines the transconductance. More specifically, the transcondectance in each circuit is the inverse of the resistance of resistor R3 or resistor R8. In both embodiments the resistance of resistors R3 and R8 are selected to be 56.2 ohms giving rise to a transconductance of 0.0178 mhos (1/56.2).

In both embodiments, the resistance $R_S$ is the sum of the resistance of resistors R1 and R2. The resistors R1 and R2 have in both embodiments been selected to have equal resistances of 374 ohms giving a resistance of 748 ohms for $R_S$. Assuming that pot core inductors are used for windings 16a, 16b and 16c then K can be taken as equal to one. The above values for the transconductance and resistance of $R_S$ may the be substituted in the equation for the multiplication factor (M.F.):

$$M.F. = 1 + K g_m R_S$$

to give a multiplication factor of 14.17. The inductance of windings 16a and 16b taken in series in both embodiments is 350 mH. As in both embodiments the turns ratio of the transformer is one to one, the inductance of winding 16c in both embodiments is also 350 mH.

Therefore, in both embodiments the multiplication factor makes that inductance appear as 4.96 H (350 mH × 14.17).

Referring once again to FIG. 3 it has been assumed thus far that the transformer 32 has a one to one turns ratio. If the transformer does not have such a ratio but rather a ratio of N to one, then the effective inductance, Leff, is:

$$L_{eff} = L_p(1 + (K g_m R_S / N))$$

The first and second embodiments for inductance multiplier circuit 10 have shown that circuit used in line feed applications. Circuit 10 may also be used to provide a low resistance DC loop closure toward an external line feed circuit while maintaining a high impedance to AC signals. One such use is where circuit 10 is located at a telephone central office (C.O.) in a current sink circuit 38.

Figure 4:
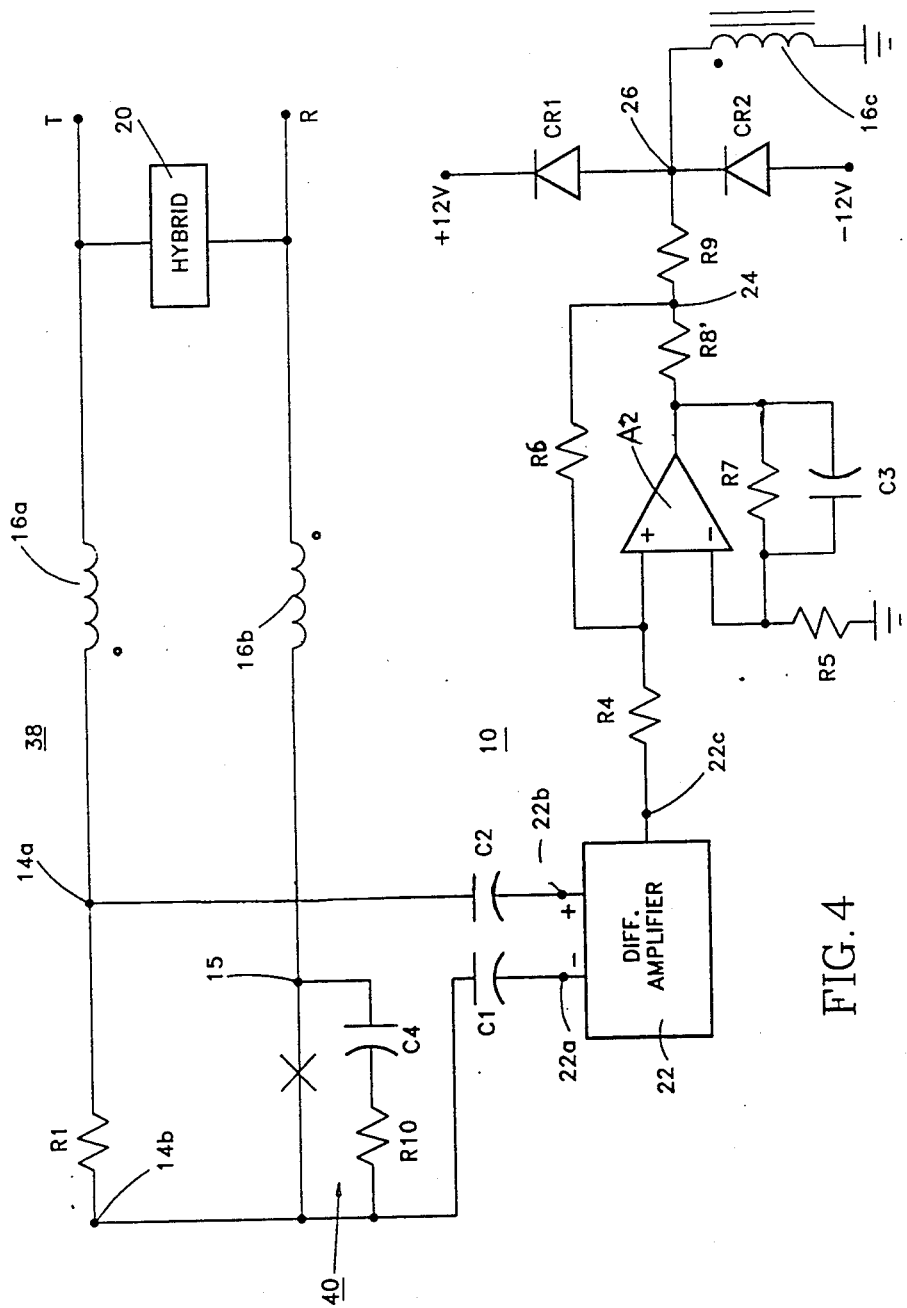
FIG. 4 is a block-schematic diagram showing an embodiment of the inductance multiplier circuit of the present invention for use in providing a closure toward an external line feed circuit.

Referring now to FIG. 4 there is shown an embodiment for circuit 10 used in circuit 38 to provide a closure toward an external line feed circuit. This embodiment differs from the one shown in FIG. 2 in that the resistor R2 is not used. Only resistor R1 need be used as the loop closure resistance presented by circuit 38 is only required to be half of the line feed resistance presented by circuit 18. Resistor R1 is also sufficient by itself to serve as the means to sense the flow of AC current in windings 16a and 16b. Resistor R1 also serves to dissipate power.

This embodiment also differs from the one shown in FIG. 2 in that there is connected between junction 14b and the nondotted end of winding 16b the parallel combination of the loop closure relay (L.C.) contact an AC contact bypass circuit 40 made up of the series combination of a resistor R10 and a capacitor C4. The L.C. contact, also known as the off-hook relay contact, closes when the circuitry (not shown) controlling it has determined that it is appropriate to present a closure to the C.O. line feed circuit.

The closure of the L.C. contact completes a path for both AC and DC current flow through resistor R1. During the break (open) periods of dial pulsing, and when an on-hook condition is being transmitted toward the line feed circuit, the L.C. contact is open and circuit 40 provides an alternative path for the flow of AC current only in circuit 38. Without the path provided by circuit 40 the multiplier feedback loop is effectively open when the L.C. contact is open, and high-frequency instability can result.

For this embodiment of circuit 10, the current flowing into the dotted end of winding 16c is related to the voltage between terminals 14a and 14b by a transconductance, $g_m$, equal to the inverse of R8'. As described above in connection with FIG. 3, the multiplication factor (M.F.) for this embodiment is given by the previously set forth equation, viz:

$$M.F. = 1 + K g_m R_S$$

For this embodiment, $R_S$ is equal to the resistance of only resistor R1 as circuit 38 does not include resistor R2. In circuit 38, the resistance of resistor R1 is the same as the resistance of resistor R1 for the embodiment shown in FIG. 2. Therefore, the resistance of $R_S$ in this embodiment is one-half the resistance of $R_S$ in that embodiment.

In order that the embodiment of FIG. 4 provide the same multiplication factor as the embodiment of FIG. 2, it is then necessary for $g_m$ to have twice the value it had for the embodiment of FIG. 2. A $g_m$ is the inverse of the resistance of resistor R8', the resistance of that resistor is then one-half of the resistance of resistor R8 of FIG. 2.

It is to be understood that the description of the preferred embodiments are intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. An inductance multiplier circuit comprising:
   (a) a transformer having inductively coupled first, second and third windings;
   (b) first and second inputs connected respectively to first terminals of said first and second windings such that said first and second windings induce a voltage signal in said third winding only when said first and second windings are excited by a differential signal having an AC component appearing at said inputs;
   (c) means connected to respective second terminals of said first and second windings for detecting only said AC component of said differential signal after said differential signal has passed through said first and second windings and producing therefrom a corresponding detected signal; and
   (d) current source means connected to said third winding and responsive to said detected signal for producing a corresponding current signal which is provided to said third winding in a manner so as to oppose current flow therein due to said voltage signal induced in said third winding, thereby reducing current flow in said first, second and third windings, and providing a greater apparent inductance to said differential signal at said first and second terminals than the actual inductance of said transformer.

2. The inductance multiplier circuit of claim 1 wherein said first and second inputs are connected to a subscriber telephone line.

3. The inductance multiplier circuit of claim 2 further comprising DC power means connected to said second terminals of said first and second windings for providing DC power through said first and second windings to said subscriber telephone line.

4. The inductance multiplier circuit of claim 1 wherein said first and second inputs are connected to a telephone line feed circuit.

5. The inductance multiplier circuit of claim 4 further comprising:
   (i) switch means connected to said second terminals of said first and second windings for providing when said switch means is closed a path for AC and DC current to flow through said detecting means; and
   (ii) conducting means responsive only to said AC signals for providing an alternate path for said AC signals when said switch means is open.

6. The inductance multiplier circuit of claim 1 wherein said detecting means is a unity gain differential amplifier having its input connected to said second terminals and said detected signal appears at its output.

7. The inductance multiplier circuit of claim 3 wherein said detecting means is a unity gain differential amplifier having its input connected to said second terminals and said detected signal appears at its output.

8. The inductance multiplier circuit of claim 5 wherein said detecting means is a unity gain differential amplifier having its input connected to said second terminals and said detected signal appear at its output.

9. The inductance multiplier circuit of claim 1 wherein said current source means comprises amplifier means having two inputs and an output, one of said inputs being connected to said detecting means by a first resistor for receiving said detected signal and to said output by a second resistor, the other of said inputs being connected to ground by a third resistor and to said output by a fourth resistor, said output connected by a fifth resistor to said third winding.

10. The circuit of claim 9 wherein said first, second, third and fourth resistors are selected to have substantially equal resistances such that said corresponding current signal has an amplitude which is essentially dependent only on said fifth resistor's resistance.

11. A battery feed interface circuit for a subscriber telephone line having tip and ring terminals for providing battery power to the telephone while maintaining high impedance for differential AC signals, comprising:
   (a) a transformer having inductively coupled first, second and third windings;
   (b) said first and second windings having first terminals thereof respectively connected to said tip and ring terminals of said subscriber telephone line wherein a voltage signal is induced in said third winding only when said tip and ring terminals are excited by said differential AC signals;
   (c) means connected to respective second terminals of said first and second windings for detecting said voice frequency signal after it has passed through said first and second windings for producing a corresponding detected signal therefrom;
   (d) DC power means connected to said second terminals of said first and second windings for providing DC power through said first and second windings to said subscriber telephone line; and
   (e) current source means connected to said third winding and responsive to said detected signal for producing a corresponding current signal which is provided to said third winding in a manner so as to oppose current flow therein due to said voltage signal induced in said third winding, thereby reducing AC current flow in said first, second and third windings, and providing a greater apparent inductance to said AC signals at said first and second terminals than the actual inductance of said transformer.

12. The battery feed interface circuit of claim 11 wherein said detecting means is a unity gain differential amplifier having its input connected to said second terminals and said detected signal appears at its output.

13. The circuit of claim 11 wherein said current source means comprises amplifier means having two inputs and an output, one of said inputs being connected to said detecting means by a first resistor for receiving said detected signal and to said output by a second resistor, the other of said inputs being connected to ground by a third resistor and to said output by a fourth resistor, said output connected by a fifth resistor to said third winding.

14. The circuit of claim 13 wherein said first, second, third and fourth resistors are selected to have substantially equal resistances such that said corresponding current signal has an amplitude which is essentially dependent only on said fifth resistor's resistance.

15. A current sink interface circuit for providing a low impedance DC loop closure toward a telephone line feed circuit having tip and ring terminals while maintaining a high impedance for differential AC signals including voice frequency signals, comprising:
   (a) a transformer having inductively coupled first, second and third windings;
   (b) said first and second windings having first terminals thereof respectively connected to said tip and ring terminals of said telephone line feed circuit wherein a voltage signal is induced in said third winding only when said tip and ring terminals are excited by said differential AC signals;
   (c) means connected to respective second terminals of said first and second windings for detecting said AC signal after it has passed through said first and second windings for producing a corresponding detected signal therefrom;
   (d) switch means connected to said second terminals of said first and second windings for providing when said switch means is closed a path for AC and DC current to flow through said detected means;
   (e) conducting means responsive only to said AC signals for providing an alternate path for said AC signals when said switch means is open; and
   (f) current source means connected to said third winding and responsive to said detected signal for producing a corresponding current signal which is provided to said third winding in a manner so as to oppose current flow therein due to said voltage signal induced in said third winding, thereby reducing AC current flow in said first, second and third windings, and providing a greater apparent inductance to said AC signals at said first and second terminals than the actual inductance of said transformer.

16. The current sink interface circuit of claim 15 wherein said detecting means is a unity gain differential amplifier having its input connected to said second terminals and said detected signal appears at its output.

17. The circuit of claim 15 wherein said current source means comprises amplifier means having two inputs and an output, one of said inputs being connected to said detecting means by a first resistor for receiving said detected signal and to said ouput by a second resistor, the other of said inputs being connected to ground by a third resistor and to said output by a fourth resistor said output connected by a fifth resistor to said third winding.

18. The circuit of claim 17 wherein said first, second, third and fourth resistors are selected to have substantially equal resistances such that said corresponding current signal has an amplitude which is essentially dependent only on said fifth resistor's resistance.

* * * * *